US012723649B2

(12) United States Patent
Yamaguchi et al.

(10) Patent No.: US 12,723,649 B2
(45) Date of Patent: Sep. 1, 2026

(54) CONTROL SYSTEM, WORK VEHICLE, CONTROL METHOD AND COMPUTER PROGRAM

(71) Applicant: Kubota Corporation, Osaka (JP)

(72) Inventors: Tetsuo Yamaguchi, Sakai (JP); Komei Yamawaki, Sakai (JP); Mizuki Ueno, Sakai (JP)

(73) Assignee: KUBOTA CORPORATION, Osaka (JP)

(*) Notice: Subject to any disclaimer, the term of this patent is extended or adjusted under 35 U.S.C. 154(b) by 197 days.

(21) Appl. No.: 18/753,114

(22) Filed: Jun. 25, 2024

(65) Prior Publication Data

US 2025/0003485 A1 Jan. 2, 2025

(30) Foreign Application Priority Data

Jun. 30, 2023 (JP) ................................ 2023-107937

(51) Int. Cl.
*F16H 61/08* (2006.01)
*F16H 59/36* (2006.01)
(Continued)

(52) U.S. Cl.
CPC ............ *F16H 61/08* (2013.01); *F16H 59/38* (2013.01); *F16H 59/46* (2013.01); *F16H 59/70* (2013.01);
(Continued)

(58) Field of Classification Search
CPC ........ F16H 61/08; F16H 61/061; F16H 61/30; F16H 2061/062; F16H 59/38;
(Continued)

(56) References Cited

U.S. PATENT DOCUMENTS 7,246,670 B2 * 7/2007 Hayashi .................. B62D 5/07 701/52
11,841,080 B2 * 12/2023 Dalla Palma ............ B60K 6/12
2022/0196128 A1 * 6/2022 Yamaguchi ............. F16H 61/42

FOREIGN PATENT DOCUMENTS

DE 102021208184 B3 3/2022
EP 2767738 B1 7/2019
(Continued)

OTHER PUBLICATIONS

Official Communication issued in corresponding European Patent Application No. 24184998.3, mailed on Nov. 26, 2024, 8 pages.

*Primary Examiner* — Huan Le
(74) *Attorney, Agent, or Firm* — Keating & Bennett, LLP

(57) ABSTRACT

A control system to control an operation of a power transmission of a work vehicle includes a storage to store data indicating a relationship between a ratio between a rotational speed of a predetermined component on a power transmission path to transmit the rotation of the planetary transmission to wheels and a rotational speed of the internal combustion engine, and switching points at which the transmission gear of the planetary transmission is switched, and a controller to control the hydraulic clutch mechanism to perform switching of the transmission gear. Where the transmission gear is switched when the ratio changes to reach a first value corresponding to a first switching point or after the ratio reaches the first value, the controller controls the hydraulic clutch mechanism so as to start hydraulic fluid charging to perform switching of the transmission gear before the ratio reaches the first value.

20 Claims, 10 Drawing Sheets

(51) Int. Cl.

| | |
|---|---|
| ***F16H 59/38*** | (2006.01) |
| ***F16H 59/46*** | (2006.01) |
| ***F16H 59/68*** | (2006.01) |
| ***F16H 59/70*** | (2006.01) |
| ***F16H 59/72*** | (2006.01) |
| ***F16H 61/06*** | (2006.01) |
| ***F16H 61/30*** | (2006.01) |

(52) U.S. Cl.
CPC ........... *F16H 59/72* (2013.01); *F16H 61/061* (2013.01); *F16H 61/30* (2013.01); *F16H 2059/366* (2013.01); *F16H 2059/6853* (2013.01); *F16H 2059/706* (2013.01); *F16H 2061/062* (2013.01)

(58) Field of Classification Search
CPC .......... F16H 59/46; F16H 59/70; F16H 59/72; F16H 2059/366; F16H 2059/6853; F16H 2059/706
See application file for complete search history.

(56) References Cited

FOREIGN PATENT DOCUMENTS

| | | | |
|---|---|---|---|
| JP | H10329583 | A | 12/1998 |
| JP | 2022-096208 | A | 6/2022 |

* cited by examiner

CONTROL SYSTEM, WORK VEHICLE, CONTROL METHOD AND COMPUTER PROGRAM

CROSS REFERENCE TO RELATED APPLICATIONS

This application claims the benefit of priority to Japanese Patent Application No. 2023-107937 filed on Jun. 30, 2023. The entire contents of this application are hereby incorporated herein by reference.

BACKGROUND OF THE INVENTION

1. Field of the Invention

The present disclosure relates to control systems, work vehicles, control methods, and non-transitory computer-readable media including computer programs.

2. Description of the Related Art

Examples of work vehicles such as agricultural tractors include work vehicles having an internal combustion engine and a hydrostatic transmission (see, for example, Japanese Laid-Open Patent Publication No. 2022-96208). The rotation generated by the internal combustion engine and the rotation generated by the hydrostatic transmission are combined in the planetary transmission and transmitted to the wheels. The switching of the transmission gear of the planetary transmission can be performed using a clutch mechanism.

SUMMARY OF THE INVENTION

If it takes time to switch the transmission gear of the planetary transmission while the work vehicle is traveling, the user may feel a significant shift shock.

There is a need to reduce the amount of time taken to switch the transmission gear.

A control system according to an example embodiment of the present disclosure is a control system for controlling an operation of a power transmission of a work vehicle, the power transmission including a hydrostatic transmission including a hydraulic pump to which rotation generated by an internal combustion engine is transmitted to discharge hydraulic fluid in accordance with an angle of a swash plate and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the control system including a storage to store data indicating a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched, and a controller configured or programmed to control the hydraulic clutch mechanism so as to perform switching of the transmission gear based on the ratio and the data, the plurality of switching points include a first switching point, and the controller is configured or programmed to, when the ratio changes to approach a first value corresponding to the first switching point, estimate a first time period required for the ratio to reach the first value, and control the hydraulic clutch mechanism so as to start hydraulic fluid charging to perform switching of the transmission gear before the ratio reaches the first value based on the estimated first time period.

A control method according to an example embodiment of the present disclosure is a control method for controlling an operation of a power transmission of a work vehicle, the power transmission including a hydrostatic transmission including a hydraulic pump to which rotation generated by an internal combustion engine is transmitted to discharge hydraulic fluid in accordance with an angle of a swash plate and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the control method including controlling the hydraulic clutch mechanism so as to perform switching of the transmission gear based on a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched, the plurality of switching points include a first switching point, and the control method further includes, when the ratio changes to approach a first value corresponding to the first switching point, estimating a first time period required for the ratio to reach the first value, and controlling the hydraulic clutch mechanism so as to start hydraulic fluid charging to perform switching of the transmission gear before the ratio reaches the first value based on the estimated first time period.

A non-transitory computer readable medium according to an example embodiment of the present disclosure includes a computer program to cause a computer to control an operation of a power transmission of a work vehicle, the power transmission including a hydrostatic transmission including a hydraulic pump to which rotation generated by an internal combustion engine is transmitted to discharge hydraulic fluid in accordance with an angle of a swash plate and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the computer program causes the computer to perform controlling the hydraulic clutch mechanism so as to perform switching of the transmission gear based on a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched, the plurality of switching points include a first switching point, and the computer program causes the computer to further perform, when the ratio changes to approach a first value corresponding to the first switching point, estimating a first time period required for the ratio to reach the first value, and controlling the hydraulic clutch mechanism so as to start hydraulic fluid charging to perform switching of the transmission gear before the ratio reaches the first value based on the estimated first time period.

A control system according to an example embodiment of the present disclosure is a control system for controlling an operation of a power transmission of a work vehicle, the power transmission including hydrostatic transmission including a hydraulic pump to which rotation generated by an internal combustion engine is transmitted to discharge hydraulic fluid in accordance with an angle of a swash plate and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the control system includes a storage to store data indicating a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched, and a controller configured or programmed to control the hydraulic clutch mechanism so as to perform switching of the transmission gear based on the ratio and the data, the plurality of switching points include a first switching point, where the transmission gear is switched when the ratio reaches a first value corresponding to the first switching point or after the ratio reaches the first value, the controller is configured or programmed to control the hydraulic clutch mechanism so as to start hydraulic fluid charging to perform switching of the transmission gear before the ratio reaches the first value, and the controller is configured or programmed to determine a time point at which to start the hydraulic fluid charging to perform switching of the transmission gear based on a time period required before a clutch of a next transmission gear is engaged since the start of the hydraulic fluid charging to perform switching from a current transmission gear to the next transmission gear.

A control system according to an example embodiment of the present disclosure is a control system for controlling an operation of a power transmission of a work vehicle, the power transmission including a hydrostatic transmission including a hydraulic pump to which rotation generated by an internal combustion engine is transmitted to discharge hydraulic fluid in accordance with an angle of a swash plate and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the control system includes a storage to store data indicating a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched, and a controller configured or programmed to control the hydraulic clutch mechanism so as to perform switching of the transmission gear based on the ratio and the data, the plurality of switching points include a first switching point, and the controller is configured or programmed to predetermine an angle of the swash plate at the first switching point, perform a control of changing the angle of the swash plate to change a rotational speed of rotation generated by the hydraulic motor, and when the ratio changes to approach a first value corresponding to the first switching point, stop the control of changing the angle of the swash plate before the ratio reaches the first value.

When switching the transmission gear, it takes time to charge hydraulic fluid to engage the clutch of the next target transmission gear. If the hydraulic fluid charging is started after the ratio between the rotational speed of the predetermined rotating component and the rotational speed of the internal combustion engine reaches the value corresponding to a switching point, the user may feel a significant shift shock because it takes time to engage the clutch of the next target transmission gear and the amount of time required to stop the change of the ratio is long.

According to an example embodiment of the present disclosure, hydraulic fluid charging is started before the ratio reaches the value corresponding to the switching point. Thus, the switching of the transmission gear can be completed in a short amount of time when the ratio reaches the value corresponding to the switching point, thus shortening the amount of time required to stop the change of the ratio, thereby reducing the shift shock to be felt by the user.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Control systems and work vehicles including the control systems according to example embodiments of the present disclosure will now be described with reference to the drawings. In the following description of the example embodiments, like elements are denoted by like reference signs, and will not be described redundantly. Reference signs F, Re, U and D used in the figures denote front, rear, up and down, respectively. In the following description of the example embodiments, a tractor will be illustrated as an example of the work vehicle. The techniques and example embodiments of the present disclosure are also applicable to other types of work vehicles. The following example embodiments are illustrative, and the techniques of the present disclosure are not limited to the following example embodiments.

Figure 1:
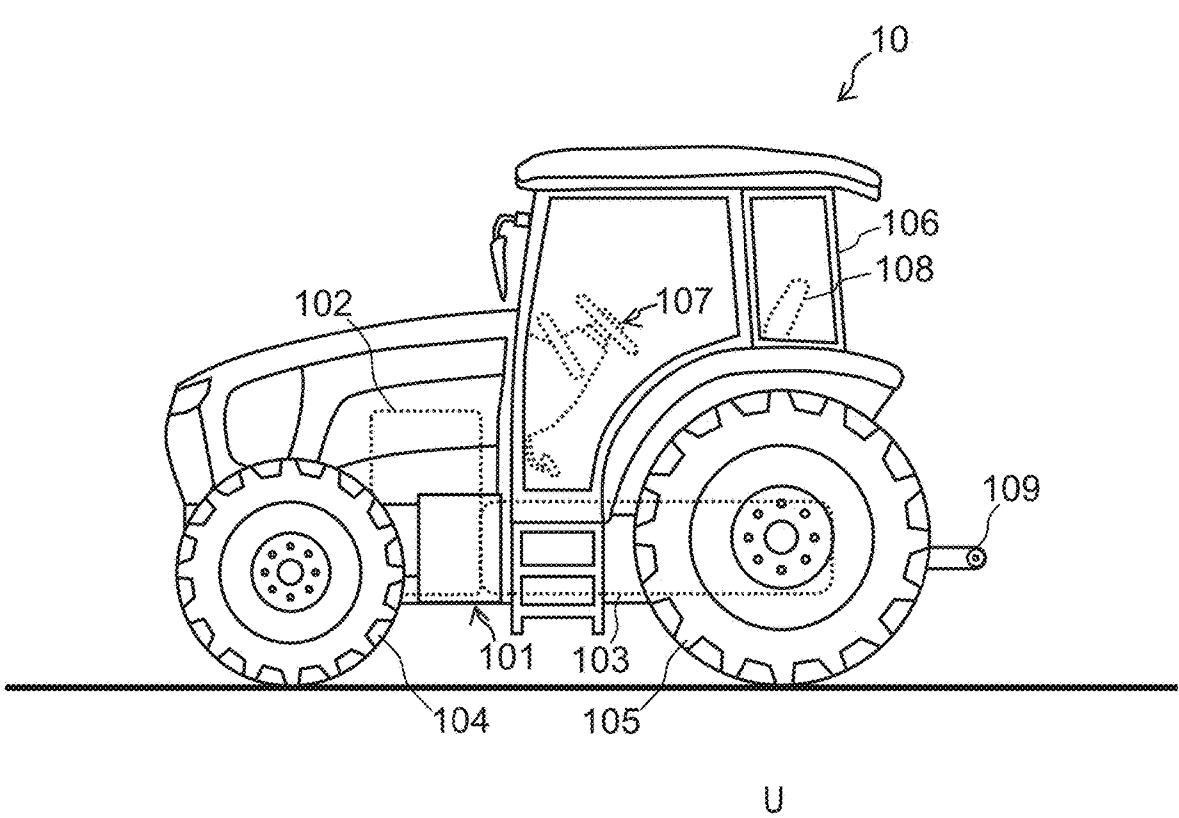
FIG. 1 is a side view schematically showing an example of a work vehicle.

FIG. 1 is a side view schematically showing an example of a work vehicle 10. The work vehicle 10 shown in FIG. 1 is a tractor, and a work equipment (implement) can be installed at one or both of the rear and the front. The work vehicle 10 can travel inside a field while performing agricultural work according to the type of the work equipment. The work vehicle 10 may travel inside or outside the field with no work equipment attached thereto.

The work vehicle 10 includes a vehicle body 101, an internal combustion engine (engine) 102, and a transmission case 103. The vehicle body 101 is provided with a pair of front wheel 104, a pair of rear wheels 105, and a cabin 106. An internal combustion engine 102 may be a diesel engine, for example. A power transmission 15 (FIG. 2) is housed in the transmission case 103. Inside the cabin 105, a driver's seat 108, a steering device 107, and operation switches are provided. When the work vehicle 10 performs tasked travel inside the field, one or both of the front wheels 104 and the rear wheels 105 may be a plurality of wheels (crawlers) with an infinite track (track) attached.

The steering system 107 includes a steering wheel, a steering shaft connected to the steering wheel, and a power steering device to assist steering by the steering wheel. The front wheels 104 are the steered wheels, such that changing their angle of turn (also referred to as "steering angle") can cause a change in the traveling direction of the work vehicle 10.

A linkage device 109 is provided at the rear of the vehicle body 101. The linkage device 109 allows a work equipment (implement) to be attached to and detached from the work vehicle 10. The linkage device 109 includes, for example, a PTO shaft, and it is possible to transmit the power of the internal combustion engine 102 to the work equipment. The work vehicle 10 can make the work equipment perform a predetermined task while pulling the work equipment. The linkage device 109 may be provided at the front of the vehicle body 101. In that case, the work equipment can be connected to the front of the work vehicle 10.

Figure 2:
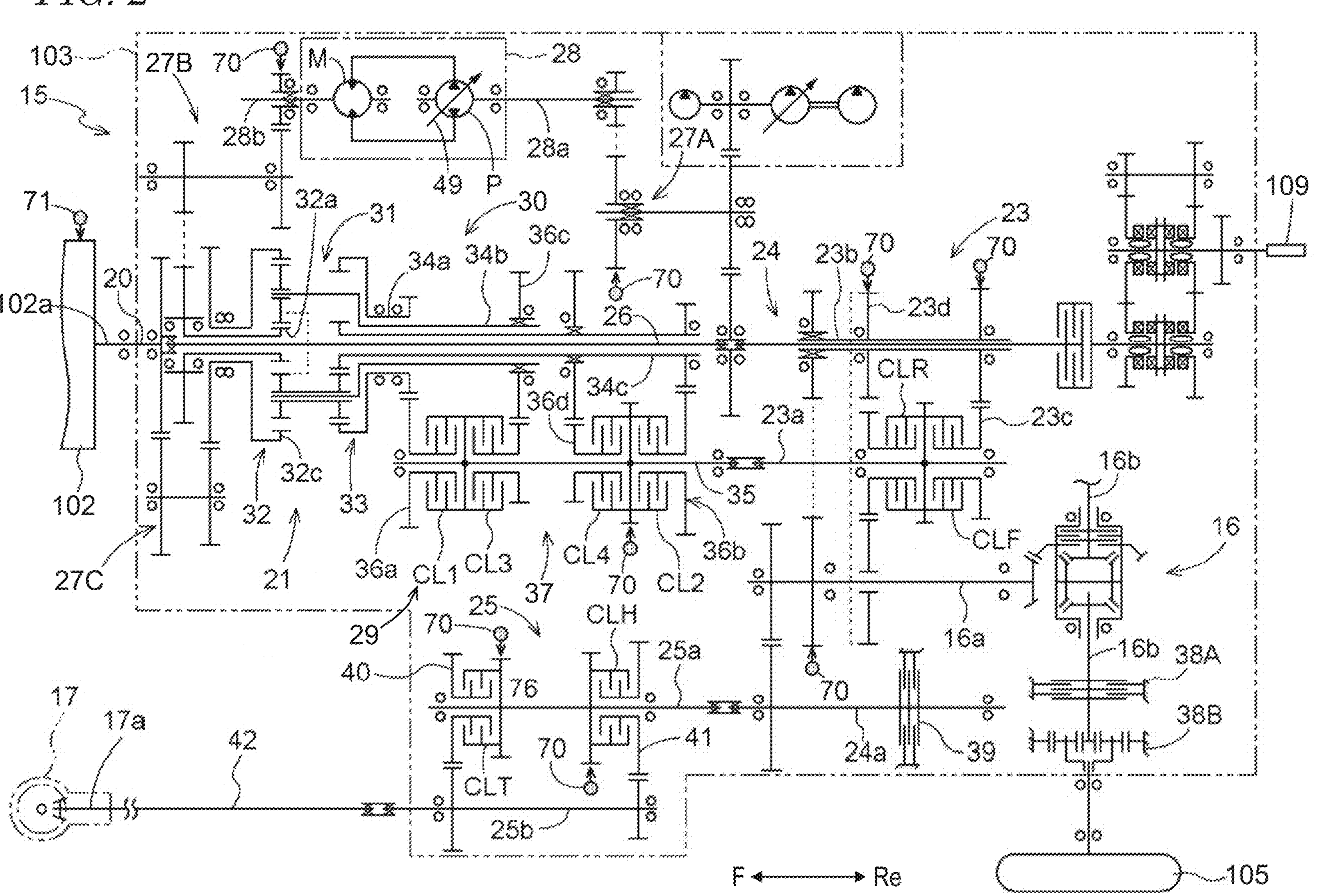
FIG. 2 is a view schematically showing a power transmission of the work vehicle.

FIG. 2 is a view schematically showing the power transmission 15 of the work vehicle 10.

At least a portion of the power transmission 15 is housed in the transmission case 103 (FIG. 1). The power transmission 15 transmits the output power of the internal combustion engine 102 to the front wheels 104 and the rear wheels 105.

The power transmission 15 includes an input shaft 20, a main transmission 21, a forward/backward switching device 23, a gear mechanism 24, a front wheel transmission mechanism 25, a rear wheel differential mechanism 16, and a front wheel differential mechanism 17. The rotation of an output shaft 102*a* of the internal combustion engine 102 is transmitted to the input shaft 20. The rotation of the output shaft 102*a* of the internal combustion engine 102 is transmitted to the input shaft 20 via a damper disc, for example. The rotation of the input shaft 20 is transmitted to the main transmission 21.

The main transmission 21 includes a hydrostatic transmission (HST: Hydro Static Transmission) 28 and a planetary transmission unit 30. The planetary transmission unit 30 includes a planetary transmission 31 and a hydraulic clutch mechanism 29. The rotation of the input shaft 20 is transmitted to the HST 28. The rotation of the input shaft 20 and the rotation generated by the HST 28 are transmitted to the planetary transmission 31. The planetary transmission 31 generates a plurality of types of rotations corresponding to a plurality of transmission gears. The hydraulic clutch mechanism 29 switches the transmission gear of the planetary transmission 31, thereby altering its gear ratio.

The HST 28 includes a hydraulic pump P, a hydraulic motor M, a pump shaft 28*a*, an output shaft 28*b*, and a swash plate 49. A rotating shaft 26 is connected to the rear end portion of the input shaft 20. A first gear mechanism 27A is connected to the rear end portion of the rotating shaft 26. The rotation of the input shaft 20 is transmitted to the pump shaft 28*a* via the rotating shaft 26 and the first gear mechanism 27A. The pump shaft 28*a* is connected to the hydraulic pump P, and the rotation of the input shaft 20 is transmitted to the hydraulic pump P. The hydraulic pump P is a variable displacement hydraulic pump. The hydraulic pump P, to which the rotation of the input shaft 20 is transmitted, discharges hydraulic fluid in accordance with the angle of the swash plate 49. The hydraulic fluid discharged by the hydraulic pump P is supplied to the hydraulic motor M, and the hydraulic motor M generates rotation. By changing the angle of the swash plate 49, it is possible to steplessly change the speed of the rotation generated by the hydraulic motor M. By changing the direction in which the swash plate 49 is tilted, the direction of the rotation generated by the hydraulic motor M can be switched between the forward rotation direction and the reverse rotation direction.

The rotation generated by the hydraulic motor M is output from the output shaft 28*b*. A second gear mechanism 27B is provided between the output shaft 28*b* and the planetary transmission 31. The rotation of the output shaft 28B is transmitted to the planetary transmission 31 via the second gear mechanism 27B. The rotation of the input shaft 20 and the rotation of the output shaft 28*b* of the HST 28 are transmitted to the planetary transmission 31.

Figure 3:
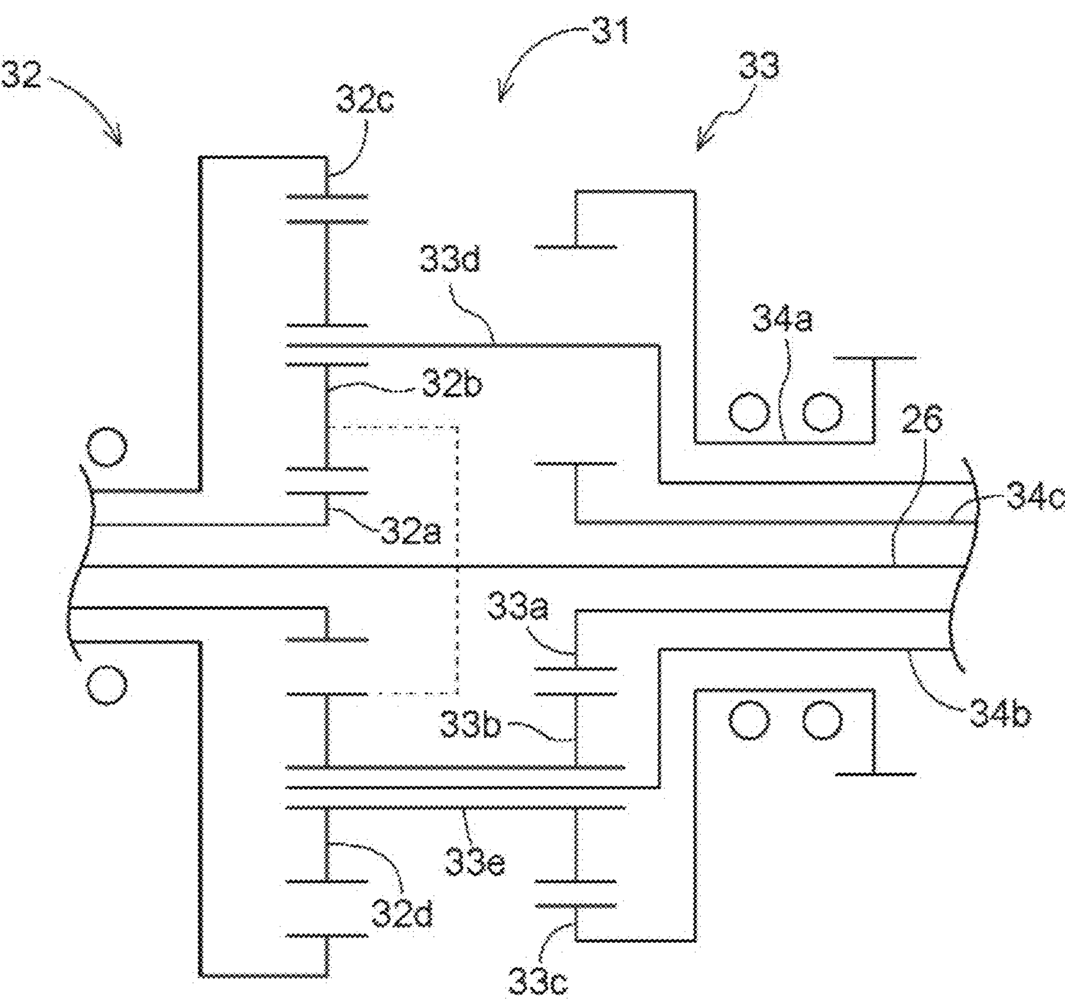
FIG. 3 is a view schematically showing a planetary transmission.

FIG. 3 is a view schematically showing the planetary transmission 31. The planetary transmission 31 includes a first planetary transmission 32 and a second planetary transmission 33. The planetary transmission 31 includes a composite planetary gear mechanism.

The first planetary transmission 32 includes a first sun gear 32*a*, a first planetary gear 32*b*, a first ring gear 32*c*, and an interlocking gear 32*d*. The second planetary transmission 33 includes a second sun gear 33*a*, a second planetary gear 33*b*, a second ring gear 33*c*, and a second carrier 33*d*.

The first sun gear 32*a* meshes with the first planetary gear 32*b*. Internal teeth that mesh with the first planetary gear 32*b* are provided on the first ring gear 32*c*. The second planetary transmission 33 is arranged rearward relative to the first planetary transmission 32. The second sun gear 33*a* meshes with the second planetary gear 33*b*. Internal teeth that mesh with the second planetary gear 33*b* are provided on the second ring gear 33*c*. The second carrier 33*d* supports the second planetary gear 33*b*. The interlocking gear 32*d* meshes with the first planetary gear 32*b*. The interlocking gear 32*d* and the second planetary gear 33*b* are linked together by a linkage member 33*e* and are interlocked with each other.

As shown in FIG. 2 and FIG. 3, the rotation of the output shaft 28*b* of the HST 28 is transmitted to the first sun gear 32*a* via the second gear mechanism 27*b*. A third gear mechanism 27C is provided between the input shaft 20 and the first ring gear 32*c*. The rotation of the input shaft 20 is transmitted to the first ring gear 32*c* via the third gear mechanism 27C.

The planetary transmission 31 includes an output device 37 (FIG. 2) that outputs the rotation. The output device 37 includes a first input shaft 34*a*, a second input shaft 34*b*, a third input shaft 34*c*, and an output shaft 35. The first input shaft 34*a* is connected to the second link gear 33*c*, the second input shaft 34*b* is connected to the second carrier 33*d*, and the third input shaft 34*c* is connected to the second sun gear 33*a*.

The output device 37 further includes a first range gear mechanism 36*a*, a second range gear mechanism 36*b*, a third range gear mechanism 36*c*, and a fourth range gear mechanism 36*d*. The hydraulic clutch mechanism 29 includes a first clutch CL1, a second clutch CL2, a third clutch CL3, and a fourth clutch CL4.

The first range gear mechanism 36*a* is connected to the first input shaft 34*a* and the rotation of the first input shaft 34*a* is transmitted thereto. The first clutch CL1 is provided between the first range gear mechanism 36*a* and the output shaft 35. When the first clutch CL1 is engaged, the rotation of the first range gear mechanism 36*a* is transmitted to the output shaft 35 via the first clutch CL1. When the first clutch CL1 is disengaged, the rotation of the first range gear mechanism 36*a* is not transmitted to the output shaft 35.

The second range gear mechanism 36*b* is connected to the third input shaft 34*c*, and the rotation of the third input shaft 34*c* is transmitted thereto. The second clutch CL2 is provided between the second range gear mechanism 36*b* and the output shaft 35. When the second clutch CL2 is engaged, the rotation of the second range gear mechanism 36*b* is transmitted to the output shaft 35 via the second clutch CL2. When the second clutch CL2 is disengaged, the rotation of the second range gear mechanism 36*b* is not transmitted to the output shaft 35.

The third range gear mechanism 36*c* is connected to the second input shaft 34*b*, and the rotation of the second input shaft 34*b* is transmitted thereto. The third clutch CL3 is provided between the third range gear mechanism 36*c* and the output shaft 35. When the third clutch CL3 is engaged, the rotation of the third range gear mechanism 36*c* is transmitted to the output shaft 35 via the third clutch CL3. When the third clutch CL3 is disengaged, the rotation of the third range gear mechanism 36*c* is not limited to the output shaft 35.

The fourth range gear mechanism 36*d* is connected to the third input shaft 34*c*, and the rotation of the third input shaft 34*c* is transmitted thereto. The fourth clutch CL4 is provided between the fourth range gear mechanism 36*d* and the output shaft 35. When the fourth clutch CL4 is engaged, the rotation of the fourth range gear mechanism 36*d* is transmitted to the output shaft 35 via the fourth clutch CL4. When the fourth clutch CL4 is disengaged, the rotation of the fourth range gear mechanism 36*d* is not transmitted to the output shaft 35.

As described above, the rotation of the output shaft 28*b* of the HST 28 is transmitted to the first sun gear 32*a*. The rotation of the internal combustion engine 102 is transmitted to the first ring gear 32*c* via the input shaft 20. The planetary transmission 31 combines these transmitted rotations, and outputs the combined rotation from the output shaft 35.

When the first clutch CL1 is engaged while the second to fourth clutches CL2 to CL4 are disengaged, the rotation of the second link gear 33*c* is transmitted to the output shaft 35 via the first input shaft 34*a*, the first range gear mechanism 36*a* and the first clutch CL1. When the first clutch CL1 is engaged while the second to fourth clutches CL2 to CL4 are disengaged, the transmission gear of the planetary transmission 31 is the "first gear". The rotation corresponding to the first gear is output from the output shaft 35.

When the second clutch CL2 is engaged while the first, third and fourth clutches CL1, CL3 and CL4 are disengaged, the rotation of the second sun gear 33*a* is transmitted to the output shaft 35 via the third input shaft 34*c*, the second range gear mechanism 36*b* and the second clutch CL2. When the second clutch CL2 is engaged while the first, third and fourth clutches CL1, CL3 and CL4 are disengaged, the transmission gear is the "second gear". The rotation corresponding to the second gear is output from the output shaft 35.

When the third clutch CL3 is engaged while the first, second and fourth clutches CL1, CL2 and CL4 are disengaged, the rotation of the second carrier 33*d* is transmitted to the output shaft 35 via the second input shaft 34*b*, the third range gear mechanism 36*c* and the third clutch CL3. When the third clutch CL3 is engaged while the first, second and fourth clutches CL1, CL2 and CL4 are disengaged, the transmission gear is the "third gear". The rotation corresponding to the third gear is output from the output shaft 35.

When the fourth clutch CL4 is engaged while the first to third clutches CL1 to CL3 are disengaged, the rotation of the second sun gear 33*a* is transmitted to the output shaft 35 via the third input shaft 34*c*, the fourth range gear mechanism 36*d* and the fourth clutch CL4. When the fourth clutch CL4 is engaged while the first to third clutches CL1 to CL3 are disengaged, the transmission gear is the "fourth gear". The rotation corresponding to the fourth gear is output from the output shaft 35.

The rotation of the output shaft 35 is transmitted to the forward/backward switching device 23. The forward/backward switching device 23 includes an input shaft 23*a*, an output shaft 23*b*, a forward gear interlocking mechanism 23*c*, a reverse gear interlocking mechanism 23*d*, a forward clutch CLF, and a reverse clutch CLR.

The rotation of the output shaft 35 is transmitted to the input shaft 23*a*. The forward clutch CLF and the reverse clutch CLR are provided on the input shaft 23*a*.

When the forward clutch CLF is engaged, the rotation of the input shaft 23*a* is transmitted to the output shaft 23*b* via the forward clutch CLF and the forward gear interlocking mechanism 23*c*. Rotation in such a direction as to move the work vehicle 10 forward is transmitted from the forward gear interlocking mechanism 23*c* to the output shaft 23*b*.

When the reverse clutch CLR is engaged, the rotation of the input shaft 23*a* is transmitted to the output shaft 23*b* via the reverse clutch CLR and the reverse gear interlocking mechanism 23*d*. Rotation in such a direction as to move the work vehicle 10 backward is transmitted from the reverse gear interlocking mechanism 23*d* to the output shaft 23*b*.

The rotation of the output shaft 23*b* is transmitted to an input shaft 16*a* of the rear wheel differential mechanism 16 and an input shaft 25*a* of the front wheel transmission mechanism 25 via the gear mechanism 24.

The rotation of the input shaft 16*a* of the rear wheel differential mechanism 16 is transmitted to the left and right rear wheels 105 via an output shaft 16*b*. FIG. 2 only shows the left rear wheel 105 of the left and right rear wheels 105. A brake 38A is provided on the output shaft 16*b*, and the rotation of the output shaft 16*b* is transmitted to the rear wheels 105 via a planetary deceleration mechanism 38B. The right rear wheel 105 also has the same power transmission structure as the power transmission structure of the left rear wheel 105.

The front wheel transmission mechanism 25 includes the input shaft 25*a*, an output shaft 25*b*, a constant-speed gear mechanism 40, a speed-increasing gear mechanism 41, a constant-speed clutch CLT, and a speed-increasing clutch CLH. The input shaft 25*a* is connected to an output shaft 24*a* of the gear mechanism 24. The rotation of the output shaft 23*b* of the forward/backward switching device 23 is transmitted to the input shaft 25*a*. A parking brake 39 is provided on the output shaft 24*a* of the gear mechanism 24. The constant-speed clutch CLT and the speed-increasing clutch CLH are provided on the input shaft 25*a* of the front wheel transmission mechanism 25.

When the constant-speed clutch CLT is engaged, the rotation of the input shaft 25*a* is transmitted to the output shaft 25*b* via the constant-speed clutch CLT and the constant-speed gear mechanism 40. When the speed-increasing clutch CLH is engaged, the rotation of the input shaft 25*a* is transmitted to the output shaft 25*b* via the speed-increasing clutch CLH and the speed-increasing gear mechanism 41. The rotation of the output shaft 25*b* is transmitted to the front wheels 104 via a rotating shaft 42 and an input shaft 17*a* of the front wheel differential mechanism 17.

When the constant-speed clutch CLT is engaged, rotation such that the circumferential speed of the front wheels 104 is equal to the circumferential speed of the rear wheels 105 is transmitted to the front wheels 104. When the speed-increasing clutch CLH is engaged, rotation such that the circumferential speed of the front wheels 104 is equal to the circumferential speed of the rear wheels 105 is transmitted to the front wheels 104. When the speed-increasing clutch CLH is engaged, the turning radius of the work vehicle 10 can be smaller than when the constant-speed clutch CLT is engaged.

The power transmission 15 (FIG. 2) is provided with a plurality of rotation sensors 70 that detect the rotation of various components. The rotational speed (the number of revolutions) of various components can be calculated by using the output signals of these rotation sensors 70. The plurality of rotation sensors 70 includes, for example, a rotation sensor that detects the rotation of the output shaft 28*b* of the HST 28, a rotation sensor that detects the rotation of the output shaft 35 of the planetary transmission 31, a rotation sensor that detects the rotation of the output shaft 23*b* of the forward/backward switching device 23, a rotation sensor that detects the rotation of the input shaft 16*a* of the rear wheel differential mechanism 16, etc. A rotation sensor 71 that detects the rotation of the internal combustion engine 102 is provided on the internal combustion engine 102. The rotation sensor 71 detects the rotation of the output shaft 102*a*, for example. The rotational speed of the internal combustion engine 102 can be calculated by using the output signal of the rotation sensor 71.

Figure 4:
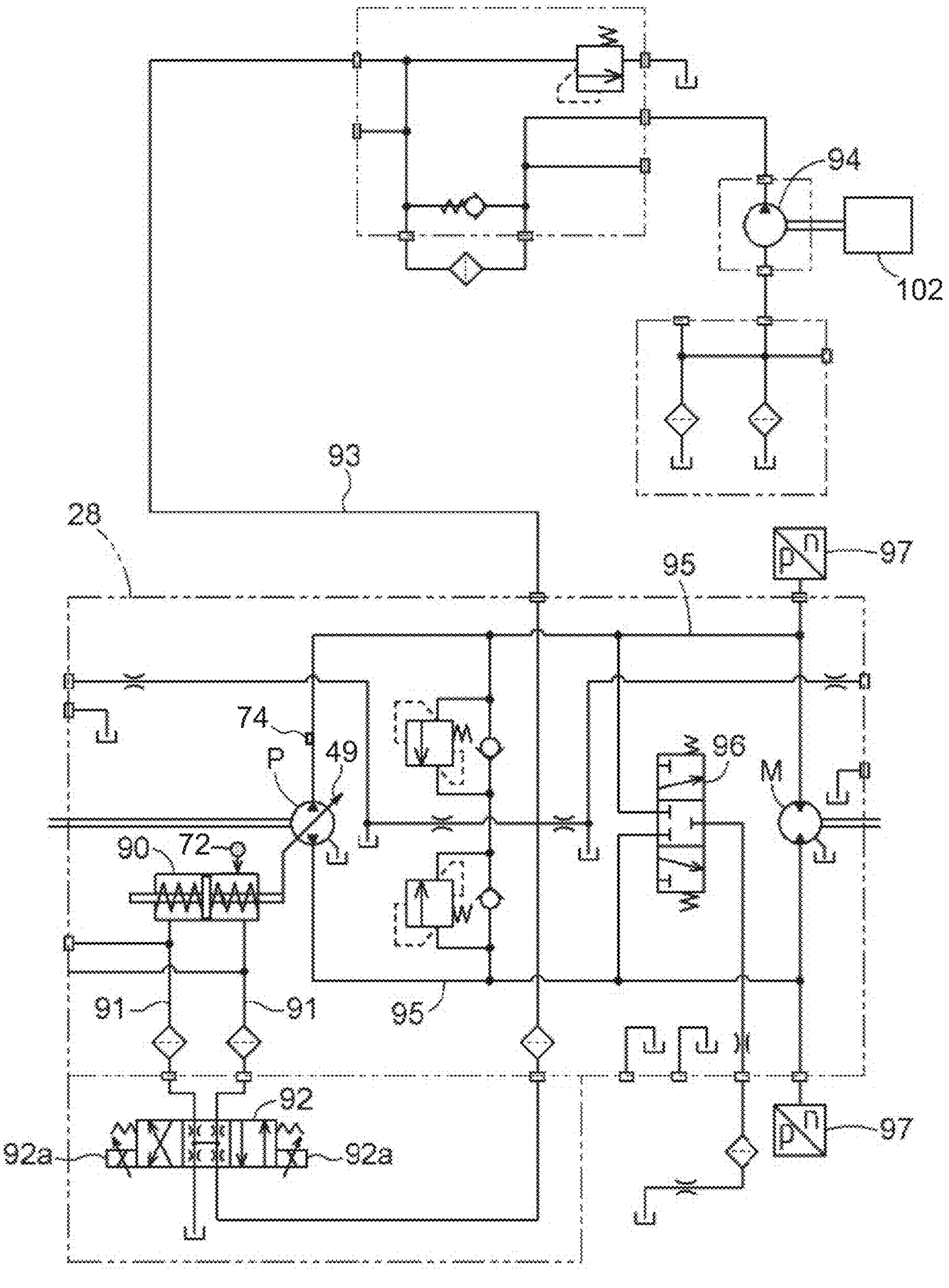
FIG. 4 is a view schematically showing a hydrostatic transmission.

FIG. 4 is a view schematically showing the HST 28. A hydraulic cylinder 90 is connected to the swash plate 49 of the hydraulic pump P. A gearshift operation valve 92 is connected to the hydraulic cylinder 90 via an operation hydraulic fluid channel 91. A hydraulic pump 94 is connected to the gearshift operation valve 92 via a hydraulic fluid feed channel 93. An emergency relief valve 96 and a pressure sensor 97 are provided on a closed circuit 95 that connects together the hydraulic pump P and the hydraulic motor M. The pressure sensor 97 detects the hydraulic pressure in the closed circuit 95. A temperature sensor 74 is provided in the closed circuit 95. By using the temperature sensor 74, it is possible to detect the temperature of the hydraulic fluid supplied to the hydraulic motor M.

Hydraulic fluid is supplied from the hydraulic pump 94 to the hydraulic cylinder 90 via the gearshift operation valve 92, thereby operating the hydraulic cylinder 90. By operating the hydraulic cylinder 90, it is possible to change the tilt angle of the swash plate 49. By switching the port of the gearshift operation valve 92, the hydraulic fluid chamber to which the hydraulic fluid is supplied can be switched between the two hydraulic fluid chambers of the hydraulic cylinder 90. The gearshift operation valve 92 is an electromagnetic valve, for example, and the port switching can be performed by operating a solenoid 92*a* of the gearshift operation valve 92. By stopping the supply of hydraulic fluid to the hydraulic cylinder 90, it is possible to maintain the position of the hydraulic cylinder 90.

The HST 28 can change the direction in which the swash plate 49 is tilted by switching the port of the gearshift operation valve 92, and the direction of the rotation generated by the hydraulic motor M can be switched between the forward rotation direction and the reverse rotation direction. The HST 28 can operate the hydraulic cylinder 90 to change the tilt angle of the swash plate 49, thereby steplessly changing the speed of the rotation generated by the hydraulic motor M.

The hydraulic cylinder 90 is provided with a position sensor 72 to detect, for example, the position of the cylinder of the hydraulic cylinder 90. Using the output signal of the position sensor 72, it is possible to calculate the tilt direction and tilt angle of the swash plate 49. A sensor to detect the tilt direction and the tilt angle of the swash plate 49 may be provided on the swash plate 49.

FIGS. 5A to 5D are views schematically showing an example of a clutch of the hydraulic clutch mechanism 29 (FIG. 2). Each of the first to fourth clutches CL1 to CL4 may have a structure of the clutch CL shown in FIGS. 5A to 5D, for example.

The clutch CL is provided with a hydraulic chamber 135. A hydraulic pump 141 and a hydraulic fluid tank 142 are connected to the hydraulic chamber 135 via a hydraulic fluid chamber 145. An open/close valve 143 is provided between the hydraulic chamber 135 and the hydraulic pump 141. An open/close valve 144 is provided between the hydraulic chamber 135 and the hydraulic fluid tank 142. The open/close valves 143 and 144 are electromagnetic valves, for example. The hydraulic pump 141 is provided with a temperature sensor 73. The temperature sensor 73 detects the temperature of hydraulic fluid supplied to the hydraulic chamber 135. There is no limitation on the position at which the temperature sensor 73 is provided.

Figure 5A:
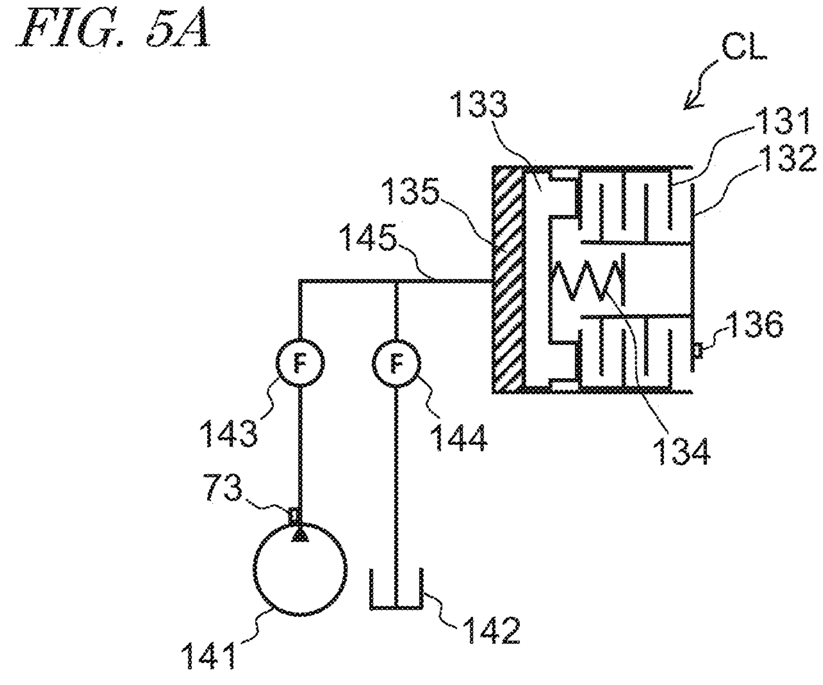
FIG. 5A is a view schematically showing an example of a clutch of a hydraulic clutch mechanism.
Figure 5B:
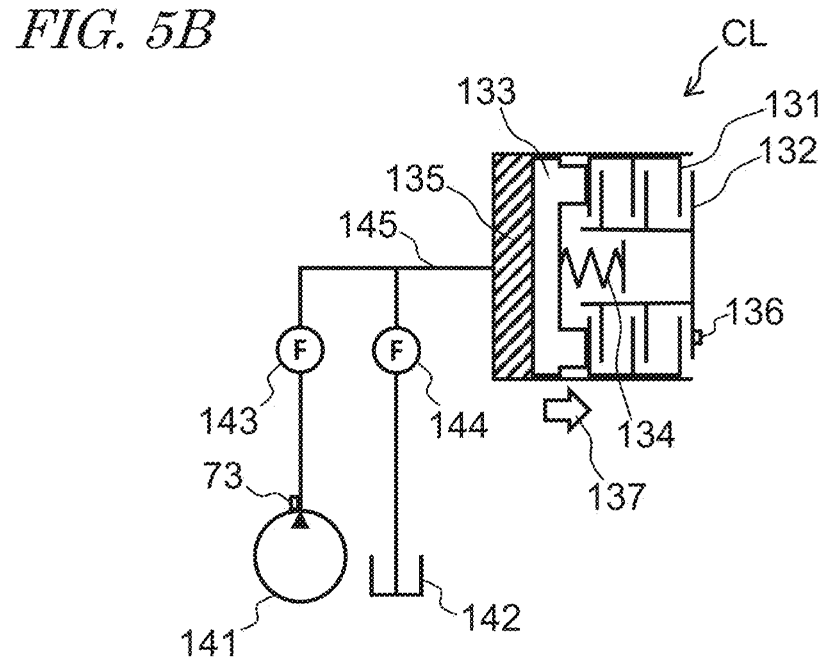
FIG. 5B is a view schematically showing an example of a clutch of the hydraulic clutch mechanism.
Figure 5C:
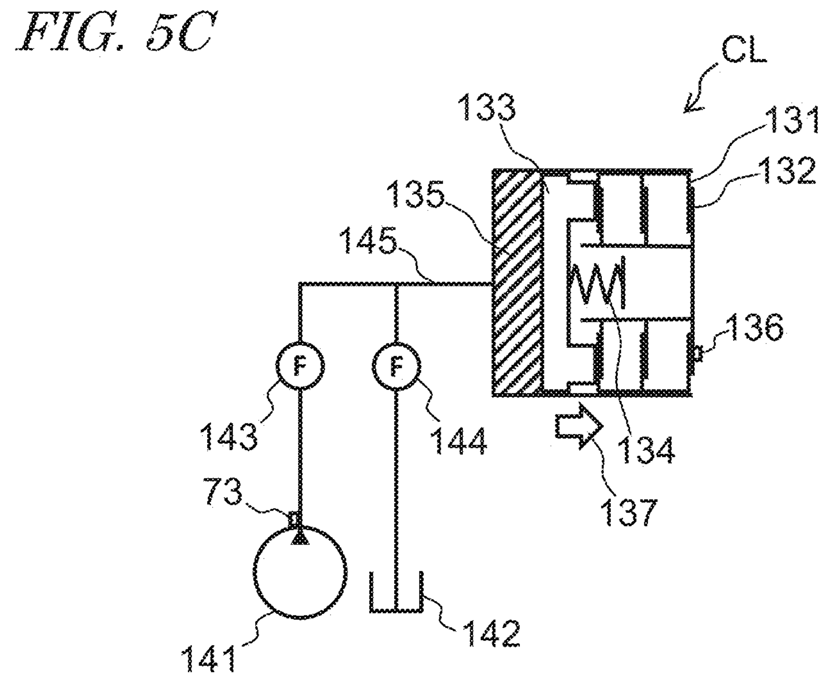
FIG. 5C is a view schematically showing an example of a clutch of the hydraulic clutch mechanism.

FIG. 5A shows the disengaged state of the clutch CL. If the open/close valve 143 is opened and the open/close valve 144 is closed while the clutch CL is disengaged, hydraulic fluid is supplied from the hydraulic pump 141 to the hydraulic chamber 135, a piston 133 moves in the direction of the arrow 137 while pushing a plate 131 as shown in FIG. 5B. As the piston 133 moves in the direction of the arrow 137 while pushing the plate 131, the plate 131 comes into contact with a plate 132, as shown in FIG. 5C, thereby bringing the clutch CL into the engaged state. The detection of contact between the plate 131 and the plate 132 can be done by using a pressure sensor 136, for example.

Figure 5D:
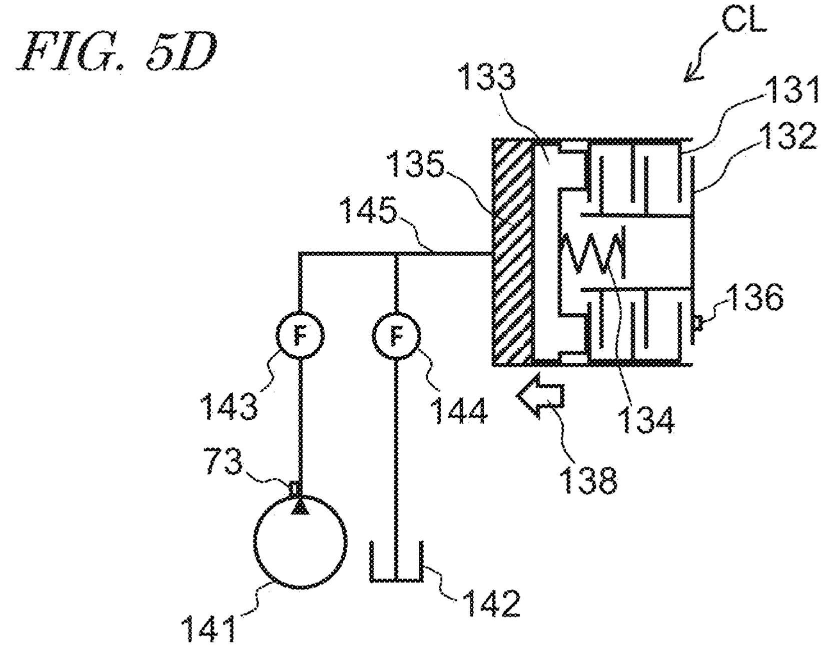
FIG. 5D is a view schematically showing an example of a clutch of the hydraulic clutch mechanism.

If the open/close valve 143 is closed and the open/close valve 144 is opened while the clutch CL is engaged, the piston 133 is moved in the direction of the arrow 138 by a return spring 134, as shown in FIG. 5D, and hydraulic fluid in the hydraulic chamber 135 is discharged into the hydraulic fluid tank 142. As the piston 133 moves in the direction of the arrow 138, the plate 131 comes off the plate 132, thereby bringing the clutch CL into the disengaged state. The piston 133 is pushed by the return spring 134 back to the position shown in FIG. 5A.

Figure 6:
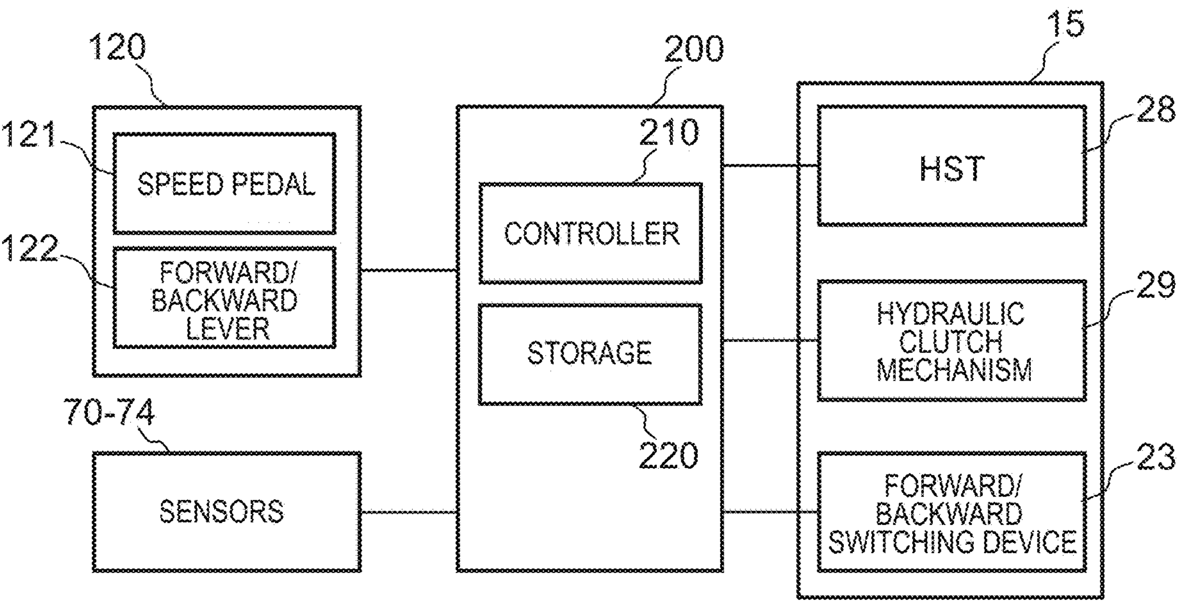
FIG. 6 is a block diagram showing an example of a control system of the work vehicle.

The work vehicle 10 includes a control system that controls the operation of the work vehicle 10. FIG. 6 is a block diagram showing an example of a control system 200 of the work vehicle 10. FIG. 6 shows elements that are relatively more relevant to the gearshift operation of the work vehicle 10, and other elements are omitted from the illustration.

The control system 200 includes a controller 210 and a storage 220. The controller 210 can be realized by a computer including a processor, such as an electronic control unit (ECU), provided in the work vehicle 10. The controller 210 may be realized by a single ECU or by a plurality of ECUs. For example, where the controller 210 is realized by a plurality of ECUs, those ECUs may be distributed in the work vehicle 10. A portion of the controller 210 may be realized by a user terminal device and/or a server computer, etc., capable of communicating with the work vehicle 10.

The controller 210 is configured or programmed to control the operation of the power transmission 15 based on the user operation on an operation device 120 and output signals of the sensors 70 to 74. The operation device 120 includes a speed pedal 121, a forward/backward lever 122, and other devices operated by the user. The controller 210 is configured or programmed to control the travel speed of the work vehicle 10 in accordance with the amount by which the speed pedal 121 is operated by the user, and switches forward/backward of the work vehicle 10 in response to the user operating the forward/backward lever 122.

The storage 220 is a storage including any storage medium, such as, for example, a semiconductor storage medium, a magnetic storage medium, or an optical storage medium. The storage 220 may be a collection of storages. The storage 220 may be a device independent of the controller 210 or may be included in the controller 210. For example, when an ECU functions as the controller 210, the memory included in the ECU may function as the storage 220. The storage 220 stores computer programs executed by the controller 120 and various information generated by the controller 120.

Figure 7:
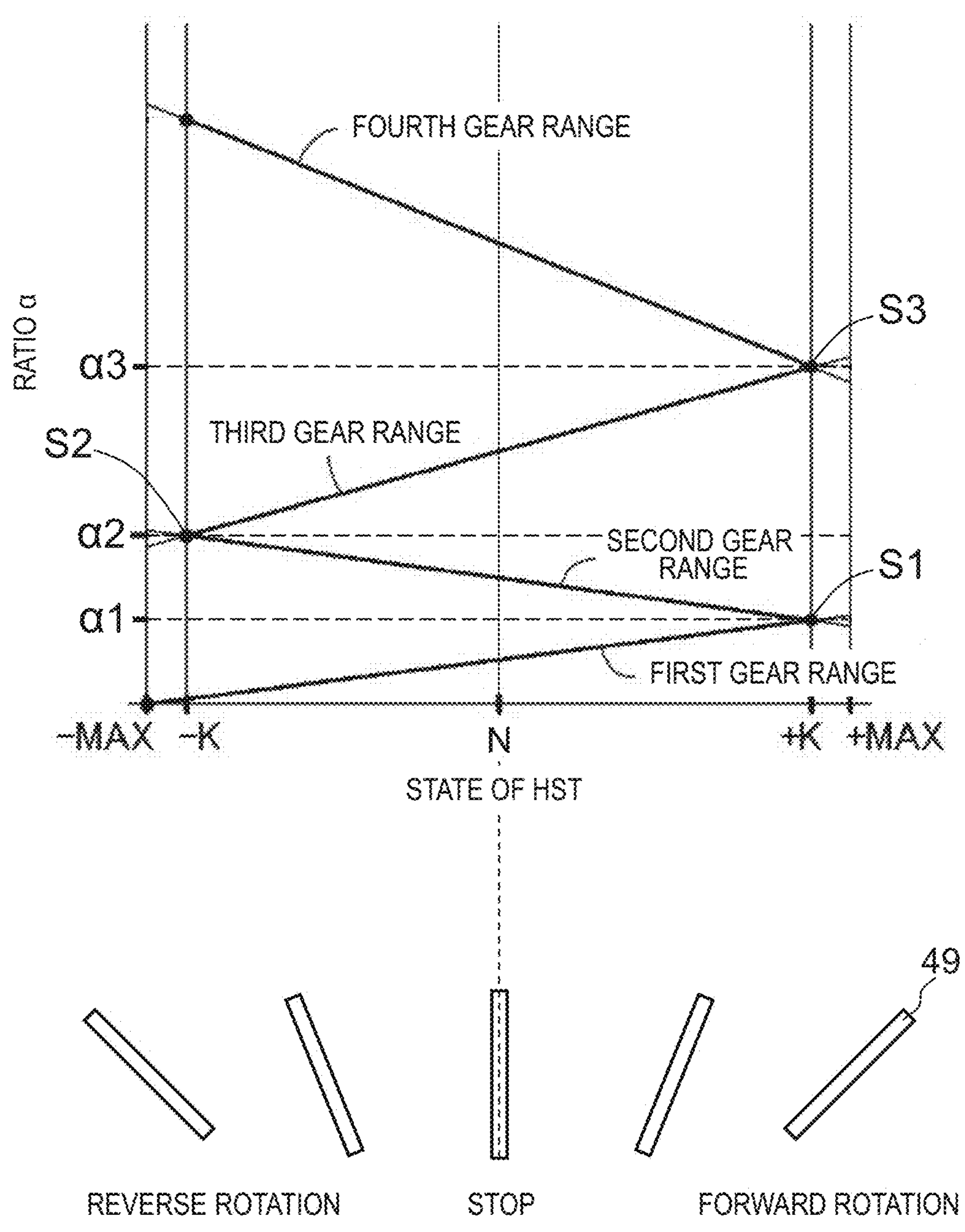
FIG. 7 is a view showing an example of a gearshift operation of the work vehicle.

FIG. 7 is a view showing an example of a gearshift operation of the work vehicle 10. The vertical axis of FIG. 7 represents the ratio α. The ratio α is the ratio between the rotational speed of the internal combustion engine 102 to the rotational speed of a predetermined component on the power transmission path to transmit the rotation of the output shaft 35 of the planetary transmission 31 to the wheels 104 and 105 and the rotational speed of the internal combustion engine 102. The predetermined component may be any component existing between the output shaft 35 and the wheels 104 and 105, and can be, for example, but not limited to, the input shaft 16*a* and the output shaft 23*b* shown in FIG. 2. The predetermined component may be any of the output shafts 35 and the wheels 104 and 105. As an example, it is assumed herein that the predetermined component is the input shaft 16*a*. Where the rotational speed of the internal combustion engine 102 is constant, the traveling speed of the work vehicle 10 increases as the ratio α increases.

The horizontal axis of FIG. 7 represents the state of the HST 28. "N" represents the neutral state of the HST 28, where the swash plate 49 is in the neutral position. "+MAX" represents the state of the HST 28 in which the hydraulic motor M generates rotation in the forward rotation direction at the maximum speed, and the swash plate 49 is tilted significantly to the side corresponding to the forward rotation. "−MAX" represents the state of the HST 28 in which the hydraulic motor M generates rotation in the reverse rotation direction at the maximum speed, and the swash plate 49 is tilted significantly to the side corresponding to the reverse rotation. "+K" represents the state of the HST 28 at the point where the transmission gear of the planetary transmission 31 is switched on the forward rotation side. "−K" represents the state of the HST 28 at the point where the transmission gear of the planetary transmission 31 is switched on the reverse rotation side. Switching points S1, S2 and S3 are the points at which the transmission gear of the planetary transmission 31 is switched.

The storage 220 stores in advance data indicating the relationship between the ratio α and the switching points S1, S2 and S3. The data includes, for example, information regarding the ratio α1 corresponding to the switching point S1, the ratio α2 corresponding to the switching point S2, and the ratio α3 corresponding to the switching point S3. The controller 210 reads that data from the storage 220. The controller 210 controls switching of the transmission gear of the planetary transmission 31 based on the readout data and the detected value of the ratio α.

The controller 210 can change the tilt angle of the swash plate 49 by, for example, controlling the operation of the gearshift operation valve 92 (FIG. 4) of the HST 28. The speed at which the swash plate 49 is tilted can be controlled by, for example, using a flow control valve. The controller 210 can switch between the engaged state and the disengaged state of each of the clutches CL1 to CL4 by, for example, controlling the operation of the open/close valves 143 and 144 (FIG. 5A to FIG. 5D).

At the time when the work vehicle 10 starts traveling, the controller 210 controls the swash plate 49 to be at a tilt angle corresponding to "−K" and also controls the hydraulic clutch mechanism 29 so that the first clutch CL1 is engaged.

When the work vehicle 10 is accelerated in response to the operation of the gearshift control pedal 121 by the user, the controller 210 changes the tilt angle of the swash plate 49 from the "−MAX" side toward the "+MAX" side. In the process of accelerating the work vehicle 10, the controller 210 controls the internal combustion engine 102 so that the rotational speed of the internal combustion engine 102 is constant. As the tilt angle of the swash plate 49 changes, the rotational speed of the reverse rotation generated by the hydraulic motor M gradually decreases, and the rotational speed becomes zero at the neutral position. By further changing the tilt angle of the swash plate 49 from the neutral position toward the "+MAX" side, the hydraulic motor M generates rotation in the forward rotation direction, and the rotational speed of the forward rotation generated by the hydraulic motor M gradually increases. In the process of thus changing the tilt angle of the swash plate 49, the ratio α increases steplessly.

When the tilt angle of the swash plate 49 changes to reach the switching point S1, the controller 210 causes the second clutch CL2 to be engaged and the first clutch CL1 to be disengaged. As a result, the transmission gear of the planetary transmission 31 switches from the first gear to the second gear. The fact that the state of the HST 28 has reached the switching points S1 to S3 can be detected, for example, from the value of the ratio α and/or the tilt angle of the swash plate 49.

With the transmission gear having been switched to the second gear, the controller 210 changes the tilt angle of the swash plate 49 from the "+MAX" side toward the "−MAX" side. In the process of changing the tilt angle of the swash plate 49, the ratio α increases steplessly.

When the tilt angle of the swash plate 49 changes to reach the switching point S2, the controller 210 causes the third clutch CL3 to be engaged and the second clutch CL2 to be disengaged. As a result, the transmission gear of the planetary transmission 31 switches from the second gear to the third gear.

With the transmission gear having been switched to the third gear, the controller 210 changes the tilt angle of the swash plate 49 from the "−MAX" side toward the "+MAX" side. In the process of changing the tilt angle of the swash plate 49, the ratio α increases steplessly.

When the tilt angle of the swash plate 49 changes to reach the switching point S3, the controller 210 causes the fourth clutch CL4 to be engaged and the third clutch CL3 to be disengaged. As a result, the transmission gear of the planetary transmission 31 switches from the third gear to the fourth gear.

With the transmission gear having been switched to the fourth gear, the controller 210 changes the tilt angle of the swash plate 49 from the "+MAX" side toward the "−MAX" side. In the process of changing the tilt angle of the swash plate 49, the ratio α increases steplessly.

Figure 8:
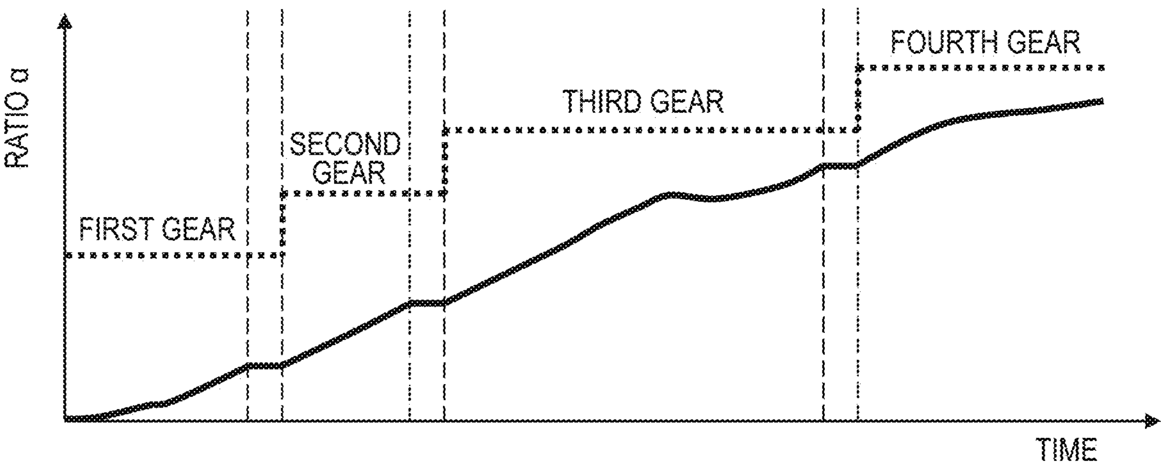
FIG. 8 is a graph showing a ratio that changes in response to the operation of a speed pedal by the user.

FIG. 8 is a view showing an example of the ratio α changing in response to the operation of the speed pedal 121 by the user. During the period of switching the transmission gear of the planetary transmission 31, the change in the ratio α becomes constant or the value of the ratio α decreases. In order to engage a clutch, the hydraulic chamber 135 (FIG. 5A to FIG. 5D) of the clutch is charged with hydraulic fluid. When switching the transmission gear of the planetary transmission 31, it takes time to charge hydraulic fluid to engage the clutch of the next target transmission gear. If the hydraulic fluid charging is started after the ratio α reaches the value corresponding to the switching point, the user may feel a significant shift shock because it takes time to engage the clutch of the next target transmission gear and the amount of time required to stop the change of the ratio α is long.

In the present example embodiment, the hydraulic fluid charging to engage the clutch of the next transmission gear is started before the ratio α reaches the value corresponding to the switching point. Thus, the switching of the transmission gear can be completed in a short amount of time when the ratio α reaches the value corresponding to the switching point, thereby reducing the shift shock to be felt by the user. The details of this operation of the present example embodiment will now be described.

Figure 9:
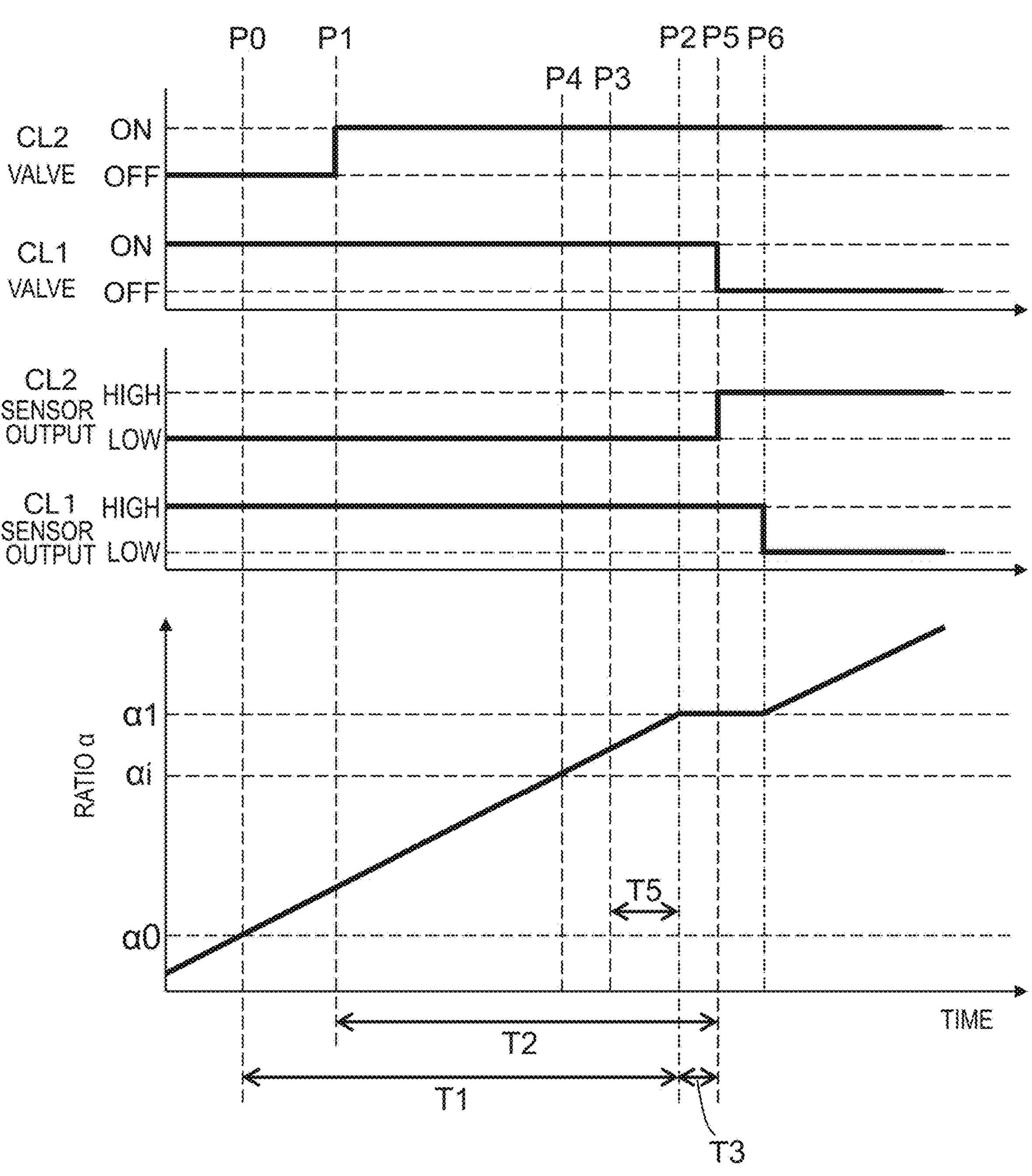
FIG. 9 is a graph illustrating an operation of switching the transmission gear of the planetary transmission.

FIG. 9 is a graph illustrating the operation of switching the transmission gear of the planetary transmission 31. As an example, the operation of switching the transmission gear of the planetary transmission 31 from the first gear to the second gear will be described here. The operation of switching between other transmission gears is the same. This operation of switching the transmission gear can also be applied to the operation of lowering the transmission gear (e.g., from the second gear to the first gear).

"CL2 valve" shown in FIG. 9 represents the state of the open/close valves 143 and 144 of the second clutch CL2 (FIG. 5A to FIG. 5D). "CL2 valve" being "ON" indicates a state where the open/close valve 143 of the second clutch CL2 is open and the open/close valve 144 is closed. Hydraulic fluid is supplied from the hydraulic pump 141 to the hydraulic chamber 135, and the second clutch CL2 becomes engaged. "CL2 valve" being "OFF" indicates a state where the open/close valve 143 of the second clutch CL2 is closed and the open/close valve 144 is open. Hydraulic fluid in the hydraulic chamber 135 is discharged to the hydraulic fluid tank 142, and the second clutch CL2 becomes disengaged.

"CL1 valve" represents the state of the open/close valves 143 and 144 of the first clutch CL1. "CL1 valve" being "ON" indicates a state where the open/close valve 143 of the first clutch CL1 is open and the open/close valve 144 is closed. Hydraulic fluid is supplied from the hydraulic pump 141 to the hydraulic chamber 135, and the first clutch CL1 becomes engaged. "CL1 valve" being "OFF" indicates a state where the open/close valve 143 of the first clutch CL1 is closed and the open/close valve 144 is open. Hydraulic fluid in the hydraulic chamber 135 is discharged to the hydraulic fluid tank 142, and the first clutch CL1 becomes disengaged.

"CL2 sensor output" represents the output signal of the pressure sensor 136 of the second clutch CL2. "CL2 sensor output" indicates "HIGH" when the second clutch CL2 is engaged, and "CL2 sensor output" indicates "LOW" when the second clutch CL2 is disengaged. "CL1 sensor output" represents the output signal of the pressure sensor 136 of the first clutch CL1. "CL1 sensor output" indicates "HIGH" when the first clutch CL1 is engaged, and "CL1 sensor output" indicates "LOW" when the first clutch CL1 is disengaged.

The horizontal axis of the graph shown in the lower half of FIG. 9 represents time, and the vertical axis represents the ratio α. This graph shows the change in the ratio α when the transmission gear of the planetary transmission 31 is switched from the first gear to the second gear.

In the present example embodiment, the transmission gear is switched when the ratio α changes to reach the first value α1 (the ratio α1) corresponding to the switching point S1 or after the ratio α has reached the first value α1. Then, the controller 210 controls the hydraulic clutch mechanism 29 to start the hydraulic fluid charging to switch the transmission gear before the ratio α reaches the first value α1. The controller 210 estimates the time period T1 (first time period) required for the ratio α to reach the first value α1 from the current value. Based on the estimated time period T1, the controller 210 can start the hydraulic fluid charging to the hydraulic chamber 135 of the second clutch CL2 before the ratio α reaches the first value α1.

The controller 210 obtains the value of the time period T2 (second time period) required before the second clutch CL2 is engaged since the start of the hydraulic fluid charging to switch from the current transmission gear (first gear) to the next transmission gear (second gear). The controller 210 can determine, based on the time period T2, the time point P1 (first time point) to start the hydraulic fluid charging to switch the transmission gear.

The controller 210 periodically calculates the value of the ratio α using output signals of sensors 70 and 71. The controller 210 can estimate the time period T1 based on the amount of change of the ratio α per unit time, the current value of the ratio α and the first value α1. For example, if the time period T1 from the amount of change in the ratio α per unit time is estimated at a certain time point P0, it is possible to estimate that the ratio α reaches the first value α1 at the time point P2. The amount of change in the ratio α per unit time may be an average value over a certain period.

The time period T1 can be regarded as being a segment from the ratio α0, which corresponds to the start point of the time period T1 (time point P0), to the ratio α1, and the controller 210 starts the hydraulic fluid charging to the hydraulic chamber 135 of the second clutch CL2 within the segment from the ratio α0 to the ratio α1.

Note that where a work equipment is connected to the work vehicle 10, it is necessary to accelerate/decelerate the load of the work vehicle 10 including the work equipment. On the other hand, if no work vehicle is connected to the work vehicle 10, the load to be accelerated/decelerated decreases. Therefore, the values of the ratios α1 to α3 corresponding to the switching points S1 to S3 can change depending on whether or not a work equipment is connected to the work vehicle 10. Therefore, a period (segment) over which the operation of switching the valve from "OFF" to "ON" is performed may be determined based on the values of the ratios α1 to α3 that change depending on whether or not a work equipment is connected, the current transmission gear of the planetary transmission 31, and the amount of time since when the valve is turned "ON" until the output signal of the pressure sensor 136 indicates "HIGH". The time period T1 (or the segment from the ratio α0 to the ratio α1) is a period (or segment) over which the operation of switching the valve from "OFF" to "ON" is performed.

The controller 210 controls the second clutch CL2 so that the second clutch CL2 is engaged at the same time as, or after elapse of a predetermined time period T3 (second predetermined time period) since, the ratio α reaching the first value α1 (the ratio α1). While the predetermined time period T3 is about 1 millisecond to about 20 milliseconds, for example, there is no limitation thereto. The predetermined time period T3 may be zero.

The time period T2 from the start of the hydraulic fluid charging to the second clutch CL2 being disengaged to when the second clutch CL2 is engaged is predetermined, and data of the time period T2 is stored in the storage 220. The controller 210 can determine the time point P1 at which to start the hydraulic fluid charging to the second clutch CL2 based on the time periods T1, T2 and T3, for example.

Alternatively, the time period Ta since when the valve is turned "ON" until the output signal of the pressure sensor 136 indicates "HIGH" may be measured in advance, and the measured time period Ta may be stored in the storage 220. The time period T1 and the time period Ta may be compared with each other, and the controller 210 may start the hydraulic fluid charging to the hydraulic chamber 135 of the second clutch CL2 when the time period T1 becomes shorter than the time period Ta. This corresponds to the controller 210 starting the hydraulic fluid charging to the hydraulic chamber 135 of the second clutch CL2 when the difference between the current value of the ratio α and the first value α1 becomes smaller than the difference between the ratio α at the time point P1 at which the CL2 valve is turned "ON" and the ratio α when the output signal of the CL2 sensor indicates "HIGH". Therefore, it is possible to reduce or prevent the output signal of the pressure sensor 136 from indicating "HIGH" before reaching the point (e.g., the first value α1) at which to switch the transmission gear of the planetary transmission 31. Note however that if there is a disturbance such as some shaking of the work vehicle 10, the output signal of the pressure sensor 136 may not indicate "HIGH" when the time period Ta elapses since when the valve is turned ON. Therefore, a certain amount of time period T3 may be provided as a margin to determine the timing (time point P1) at which to turn the valve ON.

At the time point P1, the controller 210 opens the open/close valve 143 of the second clutch CL2 and closes the open/close valve 144. This starts supplying hydraulic fluid to the hydraulic chamber 135 of the second clutch CL2 from the hydraulic pump 141.

The ratio α reaches the first value α1 at the time point P2, and the second clutch CL2 is engaged at the time point P5. When the second clutch CL2 is engaged, the output signal of the pressure sensor 136 of the second clutch CL2 changes from "LOW" to "HIGH". When the output signal of the pressure sensor 136 of the second clutch CL2 changes from "LOW" to "HIGH", the controller 210 disengages the first clutch CL1. The controller 210 closes the open/close valve 143 of the first clutch CL1 and opens the open/close valve 144. Hydraulic fluid in the hydraulic chamber 135 of the first clutch CL1 starts to be discharged, and the first clutch CL1 is disengaged at the time point P6.

By starting the hydraulic fluid charging to engage the second clutch CL2 before the ratio α reaches the first value α1 corresponding to the switching point S1, it is possible to complete the switching of the transmission gear in a short amount of time after the ratio α reaches the first value α1. As the amount of time required for stopping the change in the ratio α is shortened, it is possible to reduce the shift shock to be felt by the user.

The time period T2 from the start of the hydraulic fluid charging to the second clutch CL2 being disengaged until when the second clutch CL2 is engaged may be changed depending on the state of the second clutch CL2. For example, the controller 210 changes the length of the time period T2 based on the elapsed time since when the second clutch CL2 is disengaged after being previously engaged.

When the elapsed time since the second clutch CL2 is disengaged after being previously engaged is short, there may be hydraulic fluid remaining in the hydraulic chamber 135 of the second clutch CL2. If the hydraulic fluid charging into the hydraulic chamber 135 is started in such a state, the second clutch CL2 is engaged in a short amount of time. Therefore, when the elapsed time since the second clutch CL2 is disengaged after being previously engaged is short, the controller 210 sets the time period T2 to be short.

For example, the time period T4 (first predetermined time period) since when the control of disengaging the second clutch CL2 being engaged is started until the hydraulic fluid of the hydraulic chamber 135 drains out is predetermined. The controller 210 sets the time period T2 to be shorter when the elapsed time is less than the time period T4 than when the elapsed time is equal to or greater than the time period T4. Therefore, it is possible to reduce or prevent the second clutch CL2 from being engaged before the ratio α reaches the first value α1.

Note that setting the time period T2 to be short can be regarded as bringing the ratio α, which corresponds to the start point of the time period T2 (the time point P1 at which to start the hydraulic fluid charging to the second clutch CL2 being disengaged), closer to the first value α1.

The time period T4 may be changed in accordance with the temperature of the hydraulic fluid supplied to the hydraulic chamber 135. The temperature of the hydraulic fluid supplied to the hydraulic chamber 135 can be detected by using the temperature sensor 73. When the temperature of the hydraulic fluid is high, the viscosity of the hydraulic fluid is lower and the hydraulic fluid will drain faster from the hydraulic chamber 135. For example, the controller 210 may set the time period T4 to be shorter when the temperature of the hydraulic fluid to be charged to engage the second clutch CL2 is higher than when it is lower.

After estimating that the ratio α reaches the first value α1 at the time point P2, the switching of the transmission gear may be discontinued before the ratio α reaches the first value α1. For example, the amount of change in the ratio α per unit time may decrease due to factors such as the user relaxing the operation of the speed pedal 121 or an increase in the load on the work vehicle 10. If it is determined that the ratio α no longer reaches the first value α1 at the time point P2 based on the calculated amount of change in the ratio α per unit time, the controller 210 discontinues the switching of the transmission gear.

The controller 210 may set a reference time point P3 (third time point), and may determine whether or not to discontinue the switching of the transmission gear before the time point P3 and not determine again whether or not to discontinue the switching of the transmission gear after the time point P3. The controller 210 sets, as the time point P3, a time point that is a predetermined time period T5 (third predetermined time period) before the time point P2. While the predetermined time period T5 is about 20 milliseconds to about 50 milliseconds, for example, there is no limitation thereto. When it is determined to discontinue the switching of the transmission gear before the time point P3, the controller 210 discontinues the switching of the transmission gear.

When it is determined not to discontinue the switching of the transmission gear past the time point P3, the controller 210 performs the switching of the transmission gear. For example, the controller 210 performs the switching of the transmission gear even if a factor to discontinue the switching of the transmission gear as described above occurs during a period of time from after the time point P3 and before reaching the time point P2. This reduces the faltering of the control process. After the switching of the transmission gear is performed, the controller 210 determines whether or not to perform switching back to the original transmission gear (first gear). For example, if the ratio α after the switching of the transmission gear is performed is smaller than the first value α1 by a predetermined value or more, the controller 210 switches the transmission gear back to the first gear. If the ratio α after the switching of the transmission gear is performed is not smaller than the first value α1 by a predetermined value or more, the switched transmission gear (second gear) is maintained.

The controller 210 may change the length of the predetermined time period T5 in accordance with the temperature of the hydraulic fluid to be charged into the second clutch CL2 to perform the switching of the transmission gear. For example, the controller 210 sets the predetermined time period T5 to be longer when the temperature of the hydraulic fluid to be charged into the second clutch CL2 is high than when the temperature is low. That is, the time point P3 is set at an earlier time point when the temperature of the hydraulic fluid is high than when the temperature is low. When the hydraulic fluid is hot, the viscosity may be small and the hydraulic fluid charging may be faster. By setting the time point P3 at an earlier time point, it is possible to perform a smooth control even if the second clutch CL2 is engaged early.

Next, a control that takes into account the overrun of the swash plate 49 will be described. For example, when the work vehicle 10 is accelerated and the ratio α changes to approach the first value α1, the tilt angle of the swash plate 49 changes continuously. Then, the swash plate 49 has an inertia acting thereon in the direction of changing the tilt angle. Therefore, even if the control to change the tilt angle of the swash plate 49 in the forward rotation direction is stopped when the ratio α changes to reach the first value α1, the tilt angle of the swash plate 49 may continue to change in the forward rotation direction due to inertia. If the tilt angle of the swash plate 49 continues to change to the forward rotation side, acceleration after switching the transmission gear to the second gear may not be smooth.

In the present example embodiment, when the ratio α changes to approach the first value α1, the control of changing the tilt angle of the swash plate 49 to the forward rotation side may be stopped before the ratio α reaches the first value α1.

The tilt angle θ1 of the swash plate 49 when the ratio α is the first value α1 is predetermined. The value of the tilt angle θ1 may be predetermined by the controller 210. Here, it is assumed that after the control to change the tilt angle of the swash plate 49 to the forward rotation side is stopped, the tilt angle of the swash plate 49 continues to change by an angle θ2 to the forward rotation side due to inertia. In this case, when the tilt angle of the swash plate 49 becomes equal to a tilt angle θ3, which is smaller than the tilt angle θ1 by the angle θ2, the controller 210 stops the control to change the tilt angle of the swash plate 49 to the forward rotation side. Thus, it is possible to reduce or prevent the overrun of the swash plate 49.

Data indicating the relationship between the tilt angle of the swash plate 49 and the ratio α is stored in advance in the storage 220. Based on that data, the controller 210 can determine the value of the ratio αi when the tilt angle of the swash plate 49 is θ3. The value of the ratio αi may be stored in advance in the storage 220. In the process of the ratio α changing to approach the first value α1, the controller 210 stops the control of changing the tilt angle of the swash plate 49 to the positive rotation side at the time point P4 when the ratio α becomes equal to the ratio αi.

The controller 210 may change the time point P4 at which the control is stopped based on the amount of change in the ratio α per unit time. For example, the controller 210 sets the time point P4 to an earlier time point when the amount of change in the ratio α per unit time is greater than when it is smaller. If the amount of change in the ratio α per unit time is large, the inertia acting on the swash plate 49 is large and the amount of overrun of the swash plate 49 may be large. When the amount of change in the ratio α per unit time is large, it is possible to reduce or prevent the overrun of the swash plate 49 by stopping the control of changing the tilt angle of the swash plate 49 to the positive rotation side earlier.

When the angle θ2 is large, the tilt angle θ3 is small and the value of the ratio αi is small. When the value of the ratio αi decreases, the time point P4 becomes an earlier point in time. At the time point P4 when the ratio α becomes equal to the ratio αi, the controller 210 stops the control of changing the tilt angle of the swash plate 49 to the positive rotation side, thereby reducing or preventing the overrun of the swash plate 49.

Data indicating the relationship between the amount of change in the ratio α per unit time and the angles θ2 and θ3 may be stored in advance in the storage 220. Data indicating the relationship between the amount of change in the ratio α per unit time and the ratio αi may be stored in advance in the storage 220. The controller 210 may use these data to stop the control of changing the tilt angle of the swash plate 49 to the positive rotation side.

The controller 210 may change the time point P4 based on the temperature of the hydraulic fluid supplied to the hydraulic motor M. For example, the controller 210 may set the time point P4 to an earlier time point when the temperature of the hydraulic fluid supplied to the hydraulic motor M is higher than when the temperature is lower. When the hydraulic fluid is hot, the viscosity may become small, and the amount of overrun of the swash plate 49 may become large. When the hydraulic fluid is hot, it is possible to reduce or prevent the overrun of the swash plate 49 by stopping the control of changing the tilt angle of the swash plate 49 to the positive rotation side earlier.

The controller 210 may change the time point P4 in accordance with the pressure of the closed circuit 95 of the HST 28. For example, if the swash plate 49 is under a force (internal pressure) in the direction of being swept (the direction of being driven around from behind), the time point P4 may be set to an earlier time point, and if the swash plate 49 is under a force in the direction of being pushed back (the direction of being stopped from the front by the brake), the time point P4 may be set to a later time point. Thus, it is possible to appropriately control the overrun of the swash plate 49.

While it is assumed in the description above that the work vehicle 10 is driven by a user, the work vehicle 10 may have a self-driving function. The techniques of the present disclosure can also be applied to the switching of the transmission gear in self-driving.

Where the controller 210 is realized by a plurality of ECUs, an ECU (ECU1) that monitors the operation of the speed pedal 121 by the user and an ECU (ECU2) that switches the transmission gear may be provided separately. In this case, ECU1 may send a command to ECU2 to switch the transmission gear based on the state of operation of the speed pedal 121, and ECU2, having received the command, may start preparing to switch the transmission gear. For example, ECU2 may start calculating the amount of change in the ratio α per unit time after receiving the command, thereby reducing the total amount of calculation.

A control system including the controller and the storage of the example embodiment described above may be installed later on the work vehicle. Such a system may be manufactured and sold independently of the work vehicle. The computer program used in such a system may also be manufactured and sold independently of the work vehicle. The computer program may be provided, for example, stored on a computer-readable, non-transitory storage medium. The computer program may also be provided by downloading via a telecommunication line (e.g., the Internet).

The techniques and example embodiments of the present disclosure are useful particularly in the technical field of transmissions of vehicles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for controlling an operation of a power transmission of a work vehicle, the power transmission including a hydrostatic transmission including a hydraulic pump to which rotation generated by an internal combustion engine is transmitted to discharge hydraulic fluid in accordance with an angle of a swash plate, and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the control system comprising:

a storage to store data indicating a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched; and a controller configured or programmed to control the hydraulic clutch mechanism so as to perform switching of the transmission gear based on the ratio and the data; wherein the plurality of switching points include a first switching point; and the controller is configured or programmed to:

when the ratio changes to approach a first value corresponding to the first switching point, estimate a first time period required for the ratio to reach the first value; and control the hydraulic clutch mechanism so as to start hydraulic fluid charging to perform switching of the transmission gear before the ratio reaches the first value based on the estimated first time period.

2. The control system according to claim 1, wherein the controller is configured or programmed to estimate the first time period based on an amount of change in a ratio per unit time.

3. The control system according to claim 1, wherein, where a current transmission gear is switched to a next transmission gear when the ratio has reached the first value or when the ratio is reaching first value, the controller is configured or programmed to determine a first time point at which to start the hydraulic fluid charging to perform switching of the transmission gear based on a second time period required before a clutch of the next transmission gear is engaged since the start of the hydraulic fluid charging to perform switching of the transmission gear.

4. The control system according to claim 3, wherein the controller is configured or programmed to determine a length of the second time period based on an elapsed time since the clutch of the next transmission gear is disengaged after being previously engaged.

5. The control system according to claim 4, wherein the controller is configured or programmed to set the second time period to be shorter when the elapsed time is shorter than a first predetermined time period than when the elapsed time is longer than the first predetermined time period.

6. The control system according to claim 5, wherein the controller is configured or programmed to set the first predetermined time period to be shorter when a temperature of hydraulic fluid to be charged to engage the clutch of the next transmission gear is a first temperature than when the temperature is a second temperature, which is lower than the first temperature.

7. The control system according to claim 3, wherein the controller is configured or programmed to determine the first time point to start the hydraulic fluid charging so that the clutch of the next transmission gear is engaged at a same time as the ratio reaches the first value or after an elapse of a second predetermined time period since the ratio reaches the first value.

8. The control system according to claim 7, wherein the second predetermined time period is about 1 millisecond to 20 milliseconds.

9. The control system according to claim 7, wherein the controller is configured or programmed to perform a control of disengaging the clutch of the transmission gear before being switched after the ratio reaches the first value.

10. The control system according to claim 1, wherein the controller is configured or programmed to:

determine whether or not to discontinue switching of the transmission gear at, or before, a third time point, which is a third predetermined time period before a second time point at which the ratio is estimated to reach the first value; and discontinue switching of the transmission gear when it is determined to discontinue switching of the transmission gear.

11. The control system according to claim 10, wherein, when it is determined not to discontinue switching of the transmission gear past the third time point, the controller is configured or programmed to perform switching of the transmission gear.

12. The control system according to claim 11, wherein the controller is configured or programmed to perform switching of the transmission gear even if a factor to discontinue switching of the transmission gear occurs during a period of time from after the third time point and before reaching the second time point.

13. The control system according to claim 12, wherein after switching of the transmission gear is performed, the controller is configured or programmed to determine whether or not to perform switching back to an original transmission gear.

14. The control system according to claim 10, wherein the controller is configured or programmed to change the third predetermined time period in accordance with a temperature of the hydraulic fluid to be charged to perform switching of the transmission gear.

15. The control system according to claim 14, wherein the controller is configured or programmed to set the third predetermined time period longer when the temperature of the hydraulic fluid to be charged to perform switching of the transmission gear is a third temperature than when the temperature is a fourth temperature, which is lower than the third temperature.

16. The control system according to claim 1, wherein the controller is configured or programmed to:

predetermine an angle of the swash plate when the ratio is equal to the first value;

change a rotational speed of rotation generated by the hydraulic motor by performing a control of changing the angle of the swash plate; and when the ratio changes to approach the first value, stop the control of changing the angle of the swash plate before the ratio reaches the first value.

17. The control system according to claim 16, wherein the controller is configured or programmed to change a fourth time point at which to stop the control of changing the angle of the swash plate based on an amount of change in a ratio per unit time.

18. A work vehicle comprising:

the control system according to claim 1;

the internal combustion engine; and the power transmission.

19. A control method for controlling an operation of a power transmission of a work vehicle, the power transmission including a hydrostatic transmission including a hydraulic pump to which rotation generated by an internal combustion engine is transmitted to discharge hydraulic fluid in accordance with an angle of a swash plate, and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the control method comprising:

controlling the hydraulic clutch mechanism so as to perform switching of the transmission gear based on a relationship between a ratio between a rotational speed of a predetermined component on a power transmission path to transmit the rotation of the planetary transmission to wheels and a rotational speed of the internal combustion engine, and a plurality of switching points, which are points at which a transmission gear of the planetary transmission is switched, the plurality of switching points including a first switching point;

when the ratio changes to approach a first value corresponding to the first switching point, estimating a first time period required for the ratio to reach the first value; and controlling the hydraulic clutch mechanism so as to start hydraulic fluid charging to perform switching of the transmission gear before the ratio reaches the first value based on the estimated first time period.

20. A non-transitory computer readable medium including a computer program to cause a computer to control an operation of a power transmission of a work vehicle, the power transmission including a hydrostatic transmission including a hydraulic pump to which rotation generated by an internal combustion engine is transmitted to discharge hydraulic fluid in accordance with an angle of a swash plate, and a hydraulic motor to which the hydraulic fluid is supplied from the hydraulic pump to generate rotation, a planetary transmission to which the rotation generated by the internal combustion engine and the rotation generated by the hydrostatic transmission are transmitted to generate multiple types of rotations corresponding to a plurality of gear ratios, and a hydraulic clutch mechanism to switch a transmission gear of the planetary transmission, the computer program causing the computer to perform:

controlling the hydraulic clutch mechanism so as to perform switching of the transmission gear based on a relationship between a ratio between a rotational speed of a predetermined component on a power transmission path to transmit the rotation of the planetary transmission to wheels and a rotational speed of the internal combustion engine, and a plurality of switching points, which are points at which the transmission gear of the planetary transmission is switched, the plurality of switching points including a first switching point;

when the ratio changes to approach a first value corresponding to the first switching point, estimating a first time period required for the ratio to reach the first value; and controlling the hydraulic clutch mechanism so as to start hydraulic fluid charging to perform switching of the transmission gear before the ratio reaches the first value based on the estimated first time period.

* * * * *